(12) United States Patent
French et al.

(10) Patent No.: US 10,261,756 B2
(45) Date of Patent: *Apr. 16, 2019

(54) METHOD FOR PREVENTING REFERENCE INVALIDATION WHEN REVERSING OPERATIONS IN SYNCHRONOUS COLLABORATIVE APPLICATIONS

(71) Applicant: Brigham Young University, Provo, UT (US)

(72) Inventors: David French, Provo, UT (US); Jeffrey Nuss, Provo, UT (US); Glen Phelps, Midvale, UT (US); Walter Edward Red, Provo, UT (US)

(73) Assignee: Brigham Young University, Provo, UT (US)

( * ) Notice: Subject to any disclaimer, the term of this patent is extended or adjusted under 35 U.S.C. 154(b) by 198 days.

This patent is subject to a terminal disclaimer.

(21) Appl. No.: 15/199,537

(22) Filed: Jun. 30, 2016

(65) Prior Publication Data

US 2017/0109120 A1  Apr. 20, 2017

Related U.S. Application Data

(60) Provisional application No. 62/169,548, filed on Jun. 1, 2015.

(51) Int. Cl.
*G06F 9/44* (2018.01)
*G06F 8/20* (2018.01)
(Continued)

(52) U.S. Cl.
CPC ............ *G06F 8/20* (2013.01); *G06F 8/70* (2013.01); *G06F 17/50* (2013.01); *H04L 67/42* (2013.01); *G06F 2217/04* (2013.01)

(58) Field of Classification Search
CPC ............ G06F 17/50–17/5095; H04L 67/42
(Continued)

(56) References Cited

U.S. PATENT DOCUMENTS 6,377,964 B1 * 4/2002 Sano .................. G06T 19/00
715/205
6,527,812 B1 * 3/2003 Bradstreet ............ G06F 9/451
715/210

(Continued)

OTHER PUBLICATIONS

Asma Cherif. Access Control Models for Collaborative Applications. Distributed, Parallel, and Cluster Computing [cs.DC]. Université Nancy 2, 2012.*

(Continued)

*Primary Examiner* — Francisco J Aponte
(74) *Attorney, Agent, or Firm* — Kunzler, PC

(57) ABSTRACT

A computer-implemented method for preventing reference invalidation when reversing operations in synchronous collaborative applications may include (i) storing, on a client, a shared model of an engineering object including one or more features, (ii) receiving, from a user, an operation to be performed on the feature, (iii) before performing the operation, storing, in a command stack on the client, information sufficient to restore the feature to a state prior to performing the operation, (iv) receiving, from the user, a request to reverse the operation, (v) determining whether reversing the operation will create an invalid reference due to a conflicting operation having been performed on the feature at a second client, and (vi) in response to determining whether reversing the operation will create an invalid reference, reversing the operation or performing a resolution operation to prevent the reference invalidation. A system corresponding to the above method is also disclosed.

17 Claims, 5 Drawing Sheets

(51) Int. Cl.
*G06F 17/50* (2006.01)
*H04L 29/06* (2006.01)
*G06F 8/70* (2018.01)

(58) Field of Classification Search
USPC .......................................... 717/121–127, 101
See application file for complete search history.

(56) References Cited

U.S. PATENT DOCUMENTS

| | | | | |
|---|---|---|---|---|
| 6,543,006 | B1* | 4/2003 | Zundel | G06F 11/141 |
| | | | | 714/15 |
| 6,618,851 | B1* | 9/2003 | Zundel | G06F 17/50 |
| | | | | 711/156 |
| 7,003,695 | B2* | 2/2006 | Li | G06F 11/3612 |
| | | | | 714/19 |
| 7,062,497 | B2* | 6/2006 | Hamburg | G06F 17/24 |
| 7,277,835 | B2* | 10/2007 | Spitz | G06T 17/10 |
| | | | | 345/20 |
| 7,818,718 | B2* | 10/2010 | Wedel | G06F 9/451 |
| | | | | 717/110 |
| 7,958,185 | B2* | 6/2011 | Rothermel | G06F 17/50 |
| | | | | 709/203 |
| 8,028,272 | B2* | 9/2011 | Eldridge | G05B 15/02 |
| | | | | 700/86 |
| 8,229,871 | B2* | 7/2012 | Woolf | G06F 17/50 |
| | | | | 706/45 |
| 8,368,640 | B2* | 2/2013 | Dardinski | G05B 15/02 |
| | | | | 345/108 |
| 8,818,769 | B2* | 8/2014 | Trainer | G06F 17/50 |
| | | | | 703/1 |
| 8,818,951 | B1* | 8/2014 | Muntz | G06F 17/30088 |
| | | | | 707/639 |
| 8,849,440 | B2* | 9/2014 | Grant | G05B 19/4097 |
| | | | | 700/105 |
| 8,892,404 | B2* | 11/2014 | Potter | G06F 17/50 |
| | | | | 703/1 |
| 9,122,817 | B2* | 9/2015 | Red | G06F 17/50 |
| 9,229,920 | B1* | 1/2016 | Fiedler | G06F 17/24 |
| 9,348,523 | B2* | 5/2016 | Busaba | G06F 9/467 |
| 9,519,528 | B2* | 12/2016 | Wada | G06F 9/44505 |
| 9,648,059 | B2* | 5/2017 | Nysetvold | H04L 65/403 |
| 9,965,572 | B1* | 5/2018 | Winn | G06F 17/50 |
| 2003/0160779 | A1* | 8/2003 | Rabinovich | G06T 17/10 |
| | | | | 345/419 |
| 2004/0083263 | A1* | 4/2004 | Richardson | H04L 63/0428 |
| | | | | 709/204 |
| 2004/0205663 | A1* | 10/2004 | Mohamed | G06F 17/24 |
| | | | | 715/255 |
| 2004/0268187 | A1* | 12/2004 | Burke | G06F 8/38 |
| | | | | 714/40 |
| 2005/0102630 | A1* | 5/2005 | Chen | G06F 3/0486 |
| | | | | 715/770 |
| 2005/0177831 | A1* | 8/2005 | Goodman | G06F 9/3004 |
| | | | | 718/100 |
| 2006/0129884 | A1* | 6/2006 | Clark | G06F 17/24 |
| | | | | 714/15 |
| 2007/0088729 | A1* | 4/2007 | Baca | G06F 9/451 |
| 2007/0162520 | A1* | 7/2007 | Petersen | G06F 11/141 |
| 2008/0172607 | A1* | 7/2008 | Baer | G06F 17/2211 |
| | | | | 715/255 |
| 2010/0217639 | A1* | 8/2010 | Wayne | G06F 17/5004 |
| | | | | 705/7.23 |
| 2010/0223032 | A1* | 9/2010 | Reghetti | G06T 19/20 |
| | | | | 703/1 |
| 2011/0113326 | A1* | 5/2011 | Baer | G06F 17/2211 |
| | | | | 715/255 |
| 2012/0110595 | A1* | 5/2012 | Reitman | G06F 17/50 |
| | | | | 719/313 |
| 2013/0239011 | A1* | 9/2013 | Red | G06T 5/00 |
| | | | | 715/743 |
| 2013/0268258 | A1* | 10/2013 | Patrudu | G06F 17/28 |
| | | | | 704/2 |
| 2014/0317531 | A1* | 10/2014 | Bowman, Jr. | H04L 65/403 |
| | | | | 715/751 |
| 2015/0271218 | A1* | 9/2015 | Steingrimsson | H04L 67/02 |
| | | | | 709/204 |
| 2016/0021183 | A1* | 1/2016 | Bowman | G06F 17/50 |
| | | | | 709/204 |
| 2016/0155161 | A1* | 6/2016 | Reisman | G06Q 10/10 |
| | | | | 705/26.1 |
| 2017/0123934 | A1* | 5/2017 | Bentley | G06F 11/1451 |

OTHER PUBLICATIONS

An Multiuser Undo/Redo Method for Replicated Collaborative Modeling Systems—Yuan Cheng, Fazhi He, Shuxu Jing, Zhiyong Huang; School of Computer Science and Technology, Wuhan University, P.R. China—Proceedings of the 2009 13th International Conference on Computer Supported Cooperative Work in Design.*

* cited by examiner

METHOD FOR PREVENTING REFERENCE INVALIDATION WHEN REVERSING OPERATIONS IN SYNCHRONOUS COLLABORATIVE APPLICATIONS

CROSS-REFERENCE TO RELATED APPLICATIONS

This application claims the benefit of U.S. provisional application 62/169,548 entitled "Method for Preventing Syntactic Reference Invalidation and Some Semantic Conflicts in Undo and Redo Commands in Synchronous Collaborative Software Applications" and filed on 1 Jun. 2015. The foregoing application is incorporated herein by reference.

BACKGROUND OF THE INVENTION

Field of the Invention

The claimed invention relates to computer aided technologies (CAx) such as computer aided design, engineering, analysis and manufacture in general and apparatus, systems, means, and methods for preventing reference invalidation when reversing operations in synchronous collaborative applications in particular.

Description of the Related Art

Large design and engineering projects require coordination of the efforts of many designers or engineers. Existing CAx systems, however, are not well-suited to collaborative design and editing. Data files cannot simply be shared among several designers without coordinating editing functions and controlling access to features of the object design, because editing conflicts may result in data loss or corruption.

A single-user CAx system that permits undoing and redoing operations typically includes one command history. When the user executes an undo command, the last operation the user performed was the last operation performed on the design model. The same may not be true in a collaborative application. Each user may perform operations on the shared design model, not necessarily aware of the operations other users may be performing at the same time. When a user executes an undo command, their intention is to undo the last command they executed, not an unknown command another user may have executed. However, unbeknownst to the user, between the time the user performed an operation on a feature of the design model and the time they executed an undo of the operation, another user may have performed an operation on the same feature or are related feature, resulting in a syntactic or semantic conflict. Accordingly, the present invention identifies and addresses a need for additional and improved apparatus, systems, means, and methods for preventing reference invalidation when reversing operation in synchronous collaborative applications.

BRIEF SUMMARY OF THE INVENTION

The present invention has been developed in response to the present state of the art, and in particular, in response to the problems and needs in the art that have not yet been fully solved by currently available systems, apparatus, and methods for reversing operations in synchronous collaborative applications. Accordingly, the claimed inventions have been developed to provide an operation reversing apparatus, method, and system that overcomes shortcomings in the art.

In one example, a computer-implemented method for preventing reference invalidation when reversing operations in synchronous collaborative applications may include (i) storing, on a CAx client, a shared model of an engineering object including one or more features, (ii) receiving, from a user, an operation to be performed on the feature, (iii) before performing the operation on the feature, storing, in a command stack on the CAx client, information sufficient to restore the feature to a state existing prior to performing the operation, (iv) receiving, from the user, a request to reverse the operation, (v) determining whether reversing the operation will create an invalid reference due to a conflicting operation having been performed on the feature at a second CAx client, and (vi) in response to determining whether reversing the operation will create an invalid reference, reversing the operation or performing a resolution operation to prevent the reference invalidation.

In one embodiment, the invalid reference may include a syntactic conflict between the state of the feature existing prior to performing the operation and a state of the feature created by the conflicting operation, or a semantic conflict between an intention of performing the operation and an intention of performing the conflicting operation. In one embodiment, the information sufficient to restore the feature to the state prior to performing the operation may include a pre-operation state of the feature, an operation identifier, and a post-operation state of the feature.

In some examples, reversing the operation may include retrieving the operation identifier from the command stack and restoring the feature to the pre-operation state of the feature. In one embodiment, the conflicting operation performed on the feature at the second CAx client may include an operation performed on the same feature as the operation requested to be reversed. In one embodiment, both the operation to be reversed and the conflicting operation may include deleting the feature, and reversing the operation will not create an invalid reference.

In one embodiment, the operation to be reversed may includes deleting the feature or editing the feature and the conflicting operation may include editing the feature. The computer-implemented method may further include determining that reversing the operation will create a possible semantic conflict relative to the intent of the conflicting operation, and the resolution operation may include informing the user that reversing the operation will create a possible semantic conflict.

In one embodiment, the conflicting operation performed on the feature at the second CAx client may include an operation performed on a child feature on which the feature depends. In one embodiment, the operation to be reversed includes deleting the feature, the conflicting operation includes creating the child feature or editing the child feature, and the resolution operation includes informing the user that reversing the operation will create an invalid syntactic reference.

In one embodiment, the operation to be reversed includes editing the feature, and the conflicting operation includes creating the child feature or editing the child feature. The computer-implemented method may further include determining that reversing the operation will create a possible semantic conflict relative to the intent of the conflicting operation, and the resolution operation may include informing the user that reversing the operation will create a possible semantic conflict.

In one embodiment, the conflicting operation performed on the feature at the second CAx client may include an operation performed on a parent feature having a dependency on the feature. In one embodiment, the operation to be reversed includes creating the feature or editing the feature, the conflicting operation includes deleting the parent feature, and the resolution operation includes informing the user that reversing the operation will create an invalid reference. In one embodiment, the operation to be reversed includes creating the feature or editing the feature, and the conflicting operation includes editing the parent feature. The computer-implemented method may further include determining that reversing the operation will create a possible semantic conflict relative to the intent of the conflicting operation and the resolution operation may include informing the user that reversing the operation will create a possible semantic conflict.

In one embodiment, a system for implementing the above-described method may include several modules stored in memory, such as (i) a storage module that stores, on a CAx client, a shared model of an engineering object including one or more features, (ii) an operation module that receives, from a user, an operation to be performed on the feature, (iii) a history module that, before performing the operation on the feature, stores, in a command stack on the CAx client, information sufficient to restore the feature to a state existing prior to performing the operation, (iv) an undo module that receives, from the user, a request to reverse the operation, (v) an analysis module that determines whether reversing the operation will create an invalid reference due to a conflicting operation having been performed on the feature at a second CAx client, and/or (vi) a resolution module that, in response to determining whether reversing the operation will create an invalid reference, reverses the operation or performs a resolution operation to prevent the reference invalidation. The system may also include at least one physical processor configured to execute the storage module, the operation module, the history module, the undo module, the analysis module, and the resolution module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) store, on a CAx client, a shared model of an engineering object including one or more features, (ii) receive, from a user, an operation to be performed on the feature, (iii) before performing the operation on the feature, store, in a command stack on the CAx client, information sufficient to restore the feature to a state existing prior to performing the operation, (iv) receive, from the user, a request to reverse the operation, (v) determine whether reversing the operation will create an invalid reference due to a conflicting operation having been performed on the feature at a second CAx client, and (vi) in response to determining whether reversing the operation will create an invalid reference, reverse the operation or perform a resolution operation to prevent the reference invalidation.

It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
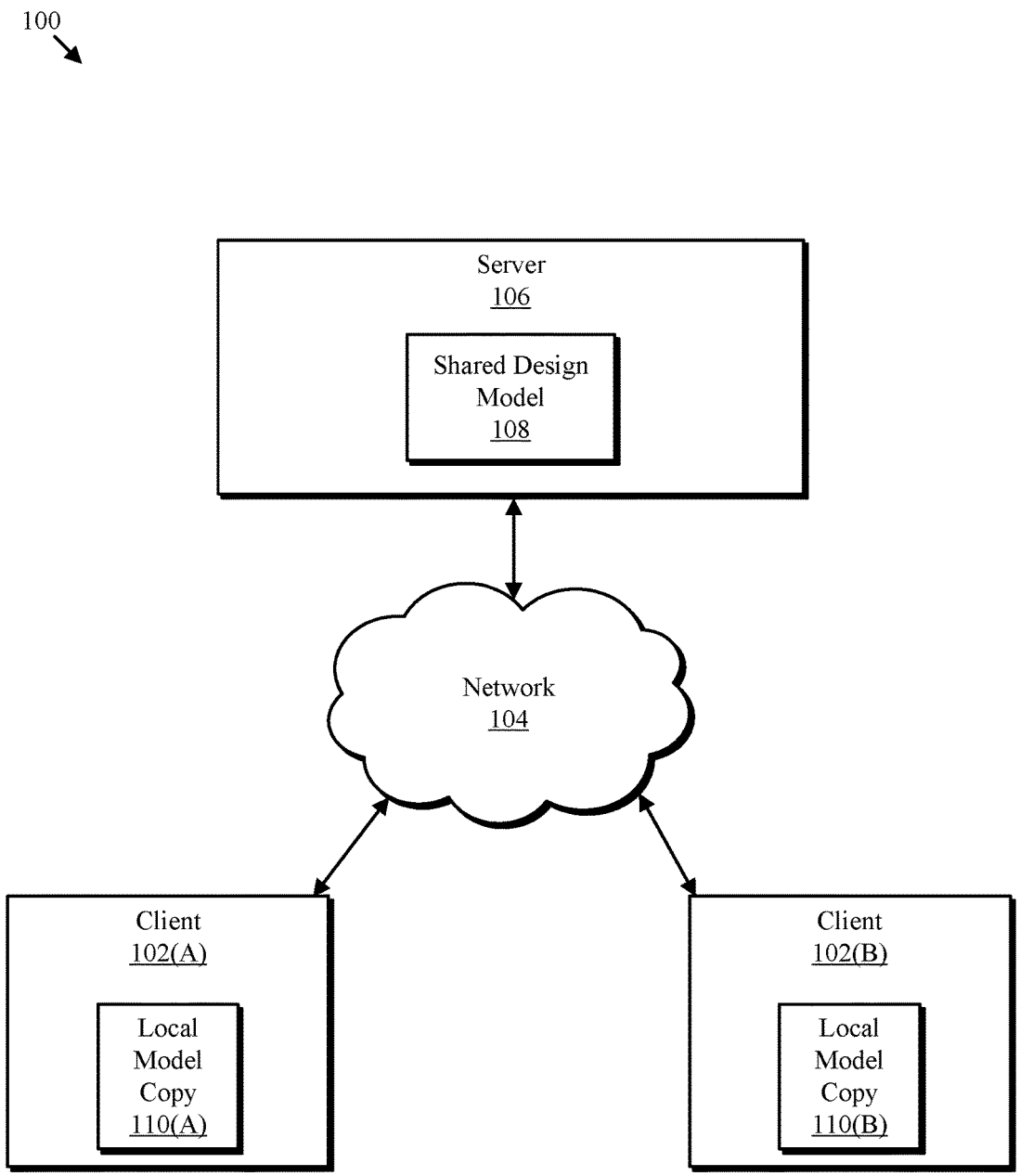
FIG. 1 is a block diagram of one example of a reference invalidation prevention system that is consistent with one or more embodiments of the claimed invention.

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a Bernoulli drive, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram of one example of a reference invalidation prevention system 100. As illustrated in this figure, system 100 may include a server 106 that hosts a database containing a shared design model 108. Server 106 may be in communication, via network 104, with two clients 102(A) and 102(B). Each of clients 102(A) and 102(B) may host local copies of shared design model 108, local model copies 110(A) and 110(B), which may contain all or part of shared design model 108.

Figure 2:
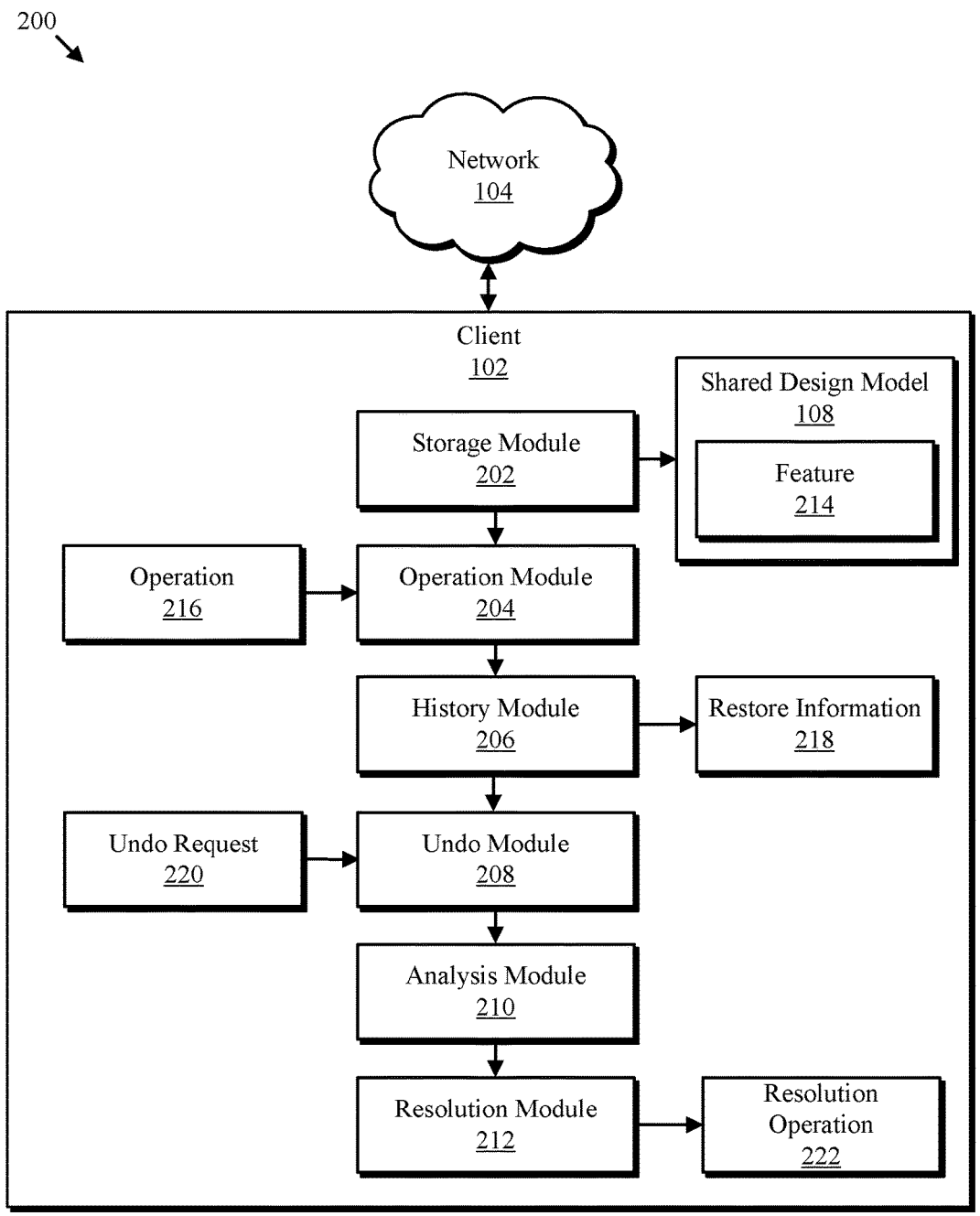
FIG. 2 is a block diagram illustrating one embodiment of a reference invalidation prevention system of the claimed invention.

FIG. 2 is a block diagram of one example of a reference invalidation prevention system 200. As illustrated in this figure, system 200 may include client 102, which is in communication with one or more other clients (not illustrated) via network 104. Unlike system 100 in FIG. 1, system 200 does not include a server. Rather, each client hosts shared design model 108, which may contain all or part of a model of an engineering object. As illustrated in FIG. 2, system 200 may include one or more modules for performing one or more tasks. For example, and as will be explained in greater detail below, system 200 may include a storage module 202 that stores, on a CAx client 102, a shared model 108 of an engineering object that includes one or more features. System 200 may additionally include an operation module 204 that receives, from a user, an operation to be performed on the feature. System 200 may also include a history module 206 that, before performing the operation on the feature, stores, in a command stack on CAx client 102, information sufficient to restore the feature to a state existing prior to performing the operation.

System 200 may additionally include an undo module 208 that receives, from the user, an undo request 220 that requests that the operation to be reversed. System 200 may also include an analysis module 210 that determines whether reversing the operation will create an invalid reference due to a conflicting operation having been performed on the feature at a second CAx client. System 200 may additionally include a resolution module 212 that, in response to determining whether reversing the operation will create an invalid reference, either reverses the operation or performs a resolution operation 222 to prevent the reference invalidation.

Although illustrated as separate elements, one or more of the modules in FIG. 2 may represent portions of a single module or application. Each of the modules may reside on a single computing device (i.e. node) or be collaboratively partitioned onto multiple devices or nodes. The modules may be primarily or wholly comprised of software codes and associated data that are executed and processed by a digital processing apparatus such as a computer to provide the specified functionality.

Figure 3:
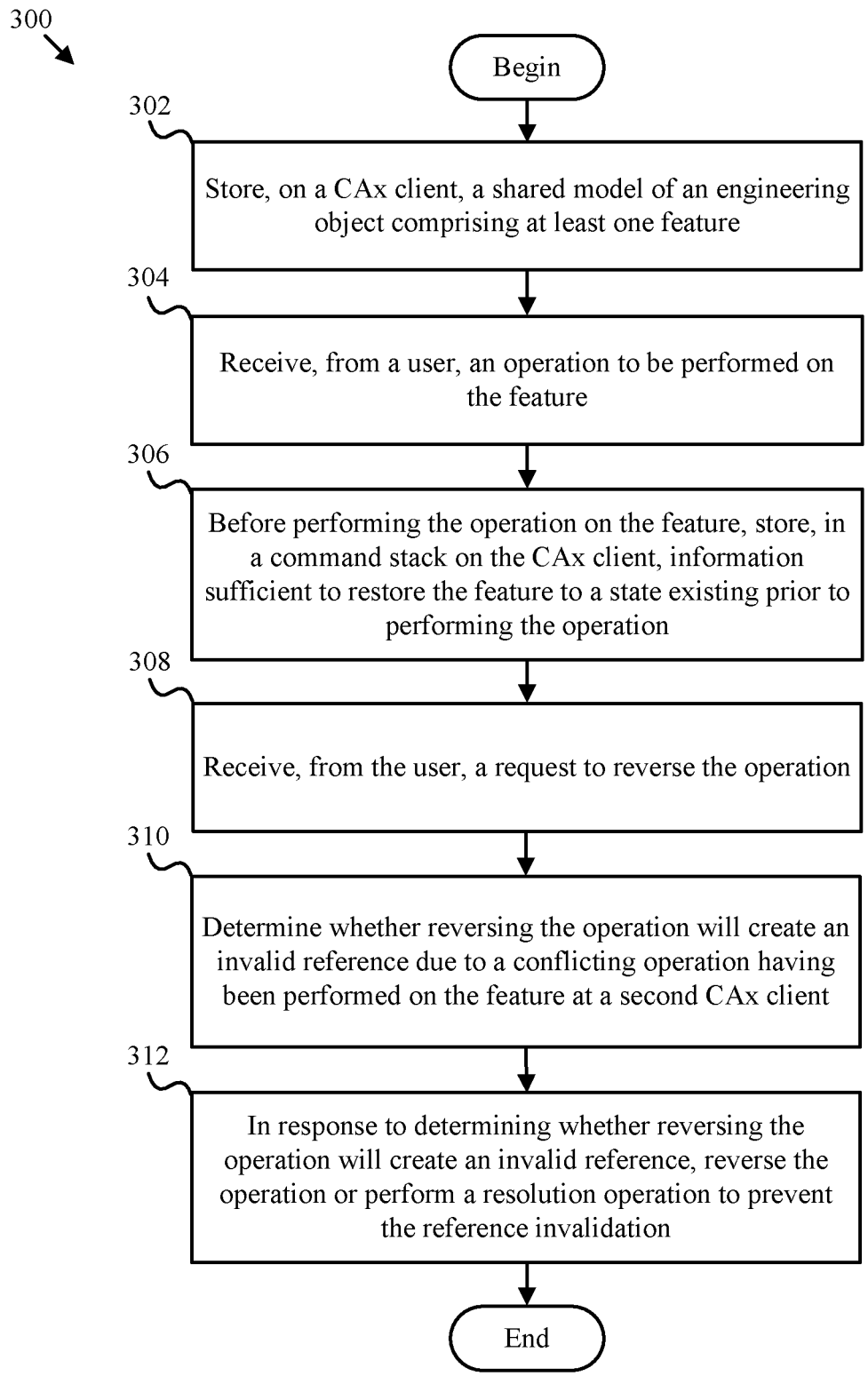
FIG. 3 is a flowchart diagram of a reference invalidation prevention method that is consistent with one or more embodiments of the claimed invention.

As illustrated in FIG. 3, at step 302, one or more of the systems described herein may store, on a CAx client, a shared model of an engineering object including one or more features. For example, storage module 202 may, as part of client 102 in FIG. 2, store, on a CAx client 102, a shared design model 108 of an engineering object including one or more features 214.

As used herein, the phrase "engineering object" generally refers to a conceptual design produced to show the look or function of an object before it is built or made. The design may be incorporated in representations such as plans, drawings, diagrams, schematics, blueprints, sketches, maps, or models and stored in one or more electronic databases. The design may include one or more "features," i.e., distinctive attributes that may be represented by one or more geometries or parameters. Features may include dependencies on other features, with the engineering object database storing representations of dependencies as a hierarchical model. Sets of features may combine to form parts, which may be combined to form assemblies or other complex constructs.

Storage module 202 may store a shared model of a design object in a variety of ways. For example, storage module 202 may, as illustrated in FIG. 1, store shared design model 108 on server 106, with local model copies 110(A) and 110(B) that may include all or part of the shared model data on one or more clients 102. In one example, server 106 may represent a portion of a cloud storage service. In another example, storage module 202 may, as illustrated in FIG. 2, store shared design model 108 on one or more clients 102.

At step 304, one or more of the systems described herein may receive, from a user, an operation to be performed on the feature. For example, operation module 204 may, as part of client 102 in FIG. 2, receive, from a user, operation 216 to be performed on feature 214.

The term "operation," as used herein, generally refers to distinctive CAx attributes that may be represented by one or more geometries or parameters. Examples of operations include creating or modifying geometric elements and their associated parameters such as the shape, dimensions, composition, material properties and tolerances of an object or portion of an object, the mesh size and required accuracy for simulations, the path and tolerances for a manufacturing tool, and any other attribute that may affect the performance of a product and the manufacture thereof. For example, a feature may define a hole created in a solid geometry or a 3D extrusion of a 2D geometry. Specific examples of operations include fillet, chamfer, or extrusion operations that create or edit geometric elements.

Operation module 204 may receive the operation in a variety of ways. For example, operation module 204 may receive an operation from a CAx system operated by a user. In another example, operation module 204 may receive an operation from an automated process of a CAx system.

At step 306, one or more of the systems described herein may store, in a command stack on the CAx client, before performing the operation on the feature, information sufficient to restore the feature to a state existing prior to performing the operation. For example, history module 206 may, as part of client 102 in FIG. 2, before performing operation 216 on feature 214, store, in a command stack on the CAx client 102, restore information 218 sufficient to restore feature 214 to a state existing prior to performing operation 216.

The term "command stack," as used herein, generally refers to a log of CAx operations that may or may not be associated with a single proprietary CAx application. For example, a command stack may be a vendor-neutral log of feature definitions that facilitates collaborate editing between various proprietary CAx applications. In another example, a command stack may be a vendor-specific record of operations performed by users of a specific CAx system. In addition to a record of CAx operations, a command stack may also include state information for features that are the object of the CAx operation. A combination of operation records and state information may facilitate undoing and redoing operations on a collaborative hierarchical design model.

History module 206 may store restore information in a variety of ways. For example, history module 206 may store on each CAx client a record of each operation performed, including a pre-operation state of the feature, an operation identifier, and a post-operation state of the feature. In one example, an operation identifier may include information identifying the type of operation, the feature or features that were the object of the operation, identification of the user who performed the operation, and data (such as a sequence number or timestamp) that may be used to determine where the operation fits in the sequence of operations performed by all users. In another example, history module 206 may store history data in a shared database on a server that both records the order of operations performed by each user and correlates the order of operations for a group of users. State information may include dependency information for features that were the object of an operation. For example, pre-operation and post-operation state information for an operation on an extrude feature may include lists of features that depend on the extrude feature.

At step 308, one or more of the systems described herein may receive, from the user, a request to reverse the operation. For example, undo module 208 may, as part of client 102 in FIG. 2, receive, from the user, an undo request 220 that requests that operation 216 be reversed. Undo module 208 may receive the request to reverse the operation in a variety of ways. For example, undo module 208 may receive a menu selection or keyboard entry from the user initiating an undo operation. In one example, the undo request is a request to reverse a previous undo operation.

At step 310, one or more of the systems described herein may determine whether reversing the operation will create an invalid reference due to a conflicting operation having been performed on the feature at a second CAx client. For example, analysis module 210 may, as part of client 102 in FIG. 2, determine whether reversing operation 216 will create an invalid reference due to a conflicting operation having been performed on feature 214 at a second CAx client.

Analysis module 210 may determine whether reversing the operation will create an invalid reference in a variety of ways. In one embodiment, the invalid reference may include a syntactic conflict between the state of the feature existing prior to performing the operation and a state of the feature created by the conflicting operation. Alternatively or additionally, the invalid reference may include a semantic conflict between an intention of performing the operation and an intention of performing the conflicting operation.

The term "syntactic conflict," as used herein, generally refers to incomplete or invalid feature definition in a design model. Syntactic conflicts result from operations performed on features with dependencies to other features or conflicting operations on a single feature.

Figure 4:
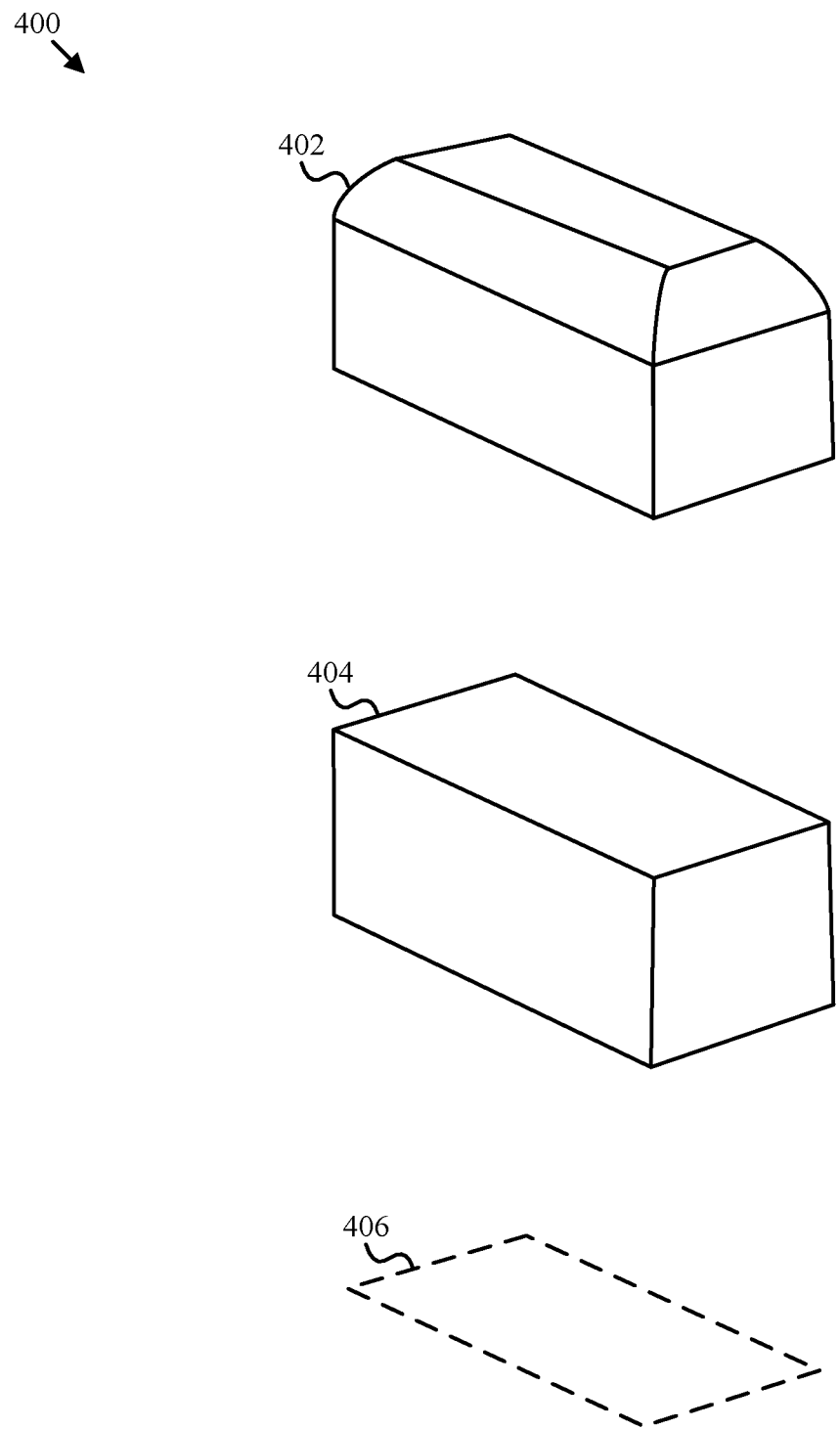
FIG. 4 is a block diagram illustrating a syntactic conflict resulting from reversing operations in a synchronous collaborative application.

FIG. 4 is a block diagram illustrating a sequence of operations 400 resulting in a syntactic conflict. As illustrated in FIG. 4, model 402 depicts an extruded block with an edge blend around its top edges. The extruded block is referred to as a parent feature of the edge blend, because the extruded block must exist before the edge blend can be performed on it. If a first user deletes the edge blend, the result is extruded block 404. A second user may subsequently or concurrently delete the extruded block. If the first user attempts to undo the operation that deleted the edge blend, a syntactic conflict arises because the user cannot undo an operation on a deleted feature. The syntactic conflict is a consequence of operations on features with a parent-child dependency.

Figure 5:
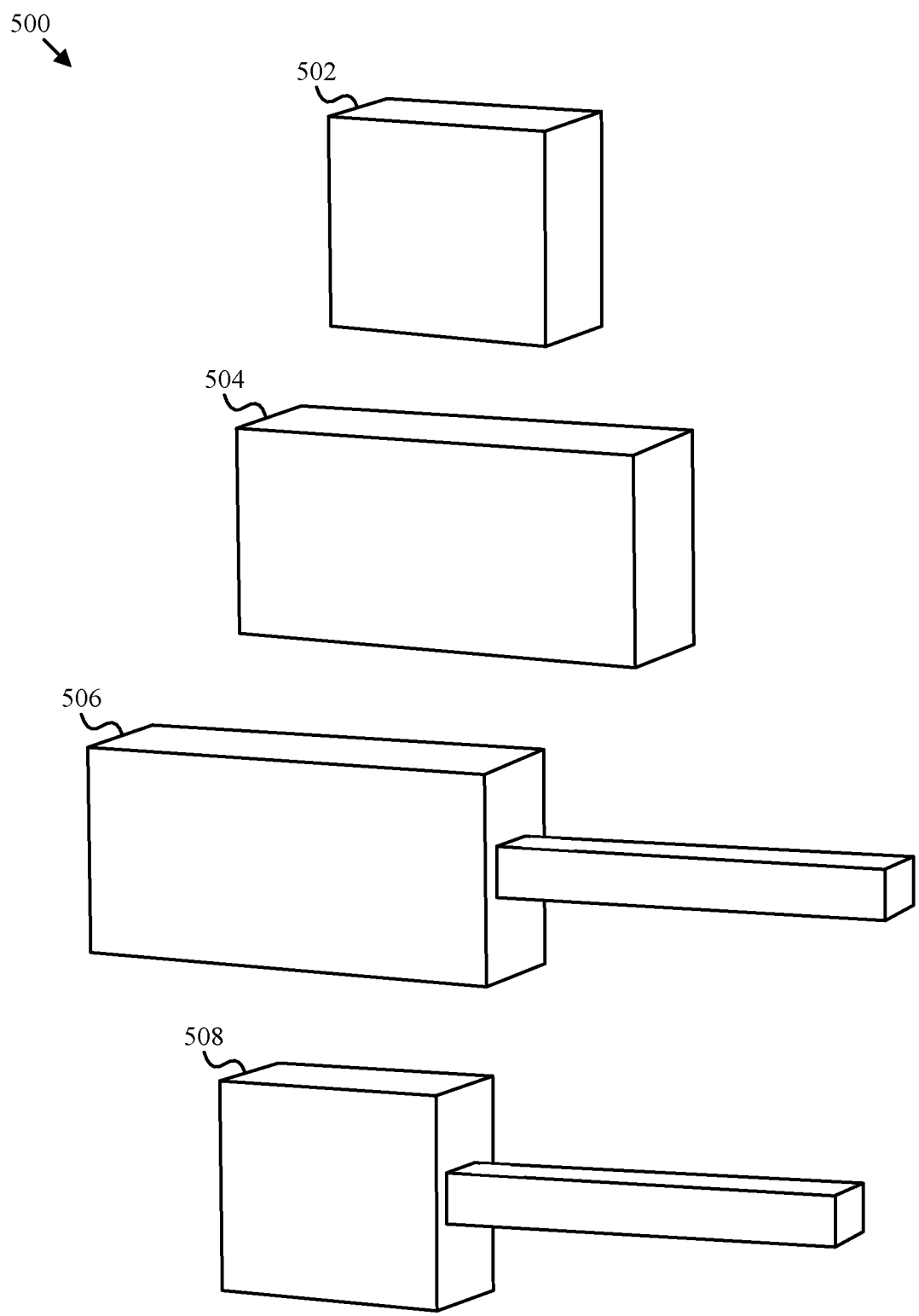
FIG. 5 is a block diagram illustrating a semantic conflict resulting from reversing operations in a synchronous collaborative application.

The term "semantic conflict," as used herein, generally refers to aspects of a design model that, while syntactically valid, do not fulfil a user's design intent. FIG. 5 is a block diagram illustrating a sequence of operations 500 resulting in a semantic conflict. As illustrated in FIG. 5, model 502 depicts an extruded block that is one unit long. A first user may extend the length of the block to two units, resulting in extruded block 504. A second user may create a sketch on the right face of extruded block 504 and extrude the sketch to make the overall length of the model a desired length of four units, as depicted in model 506. If the first user reverses the operation that extended the length of the block, the result would be as depicted in model 508. Although the model is syntactically valid, the overall length of the model is three units, which conflicts with the second user's intention for the model to be four units in length.

Undo operations may, in some situations, proceed without creating syntactic or semantic conflicts. For example, users at two clients may perform operations on the same feature. If both the operation to be reversed and the conflicting operation include deleting the feature, then reversing the operation may not create an invalid reference. In this sequence of events, the first user deletes the feature, the second user deletes the feature, then the first user reverses the operation and restores the feature. Analysis module 210 may then determine that reversing the delete operation on a deleted feature will not result in an invalid reference.

Identification and resolution of syntactic and semantic conflicts will be discussed in greater detail below, in connection with step 312.

At step 312, one or more of the systems described herein may, in response to determining whether reversing the operation will create an invalid reference, reverse the operation or perform a resolution operation to prevent the reference invalidation. For example, resolution module 212 may, as part of client 102 in FIG. 2, in response to determining whether reversing operation 216 will create an invalid reference, reverse operation 216 or perform resolution operation 222 to prevent the reference invalidation.

Resolution module 212 may reverse the operation or perform a resolution operation in a variety of ways. For example, when analysis module 210 determines that no syntactic or semantic conflict will be created by reversing the operation, resolution module 212 may reverse the operation by retrieving the operation identifier from the command stack and restoring the feature to the pre-operation state of the feature.

In various situations, syntactic and/or semantic conflicts may arise depending on the nature of the dependencies and the nature of the operation to be reversed. For example, a first user may delete or edit a feature while a second user performs an edit on the same feature. Analysis module 210 may then determine that reversing the first user's delete or edit operation will create a possible semantic conflict relative to the intent of the second user. Resolution module 212 may perform a resolution operation by informing the user that reversing the operation will create a possible semantic conflict. Resolution module 212 may also request permission from the first user before proceeding with the undo operation.

In another example, the conflicting operation performed on the feature at the second CAx client may include an operation performed on a child feature on which the feature depends. For example, a first user may delete an extrude feature at approximately the same time a second user creates or edits a sketch feature on the deleted extrude. Analysis module 210 may determine that the operation to be reversed consists of deleting the feature and the conflicting operation consists of creating the child feature or editing the child feature. Permitting the undo operation to proceed may create a syntactic conflict in which reversing the deletion invalidates the child features. Resolution module 212 may then perform a resolution operation consisting of blocking the undo operation and informing the user that reversing the operation will create an invalid syntactic reference.

In another example, the operation to be reversed may consist of editing the feature, and the conflicting operation consist of creating the child feature or editing the child feature. This is the sequence of operations described above in FIG. 5. A first user resizes an extrude feature while a second user creates a sketch on the side of the extruded block to extend the design object to a desired length. Analysis module 210 may then determine that reversing the operation will create a possible semantic conflict relative to the intent of the conflicting operation. Resolution module 212 may then perform a resolution operation consisting of informing the user that reversing the operation will create a possible semantic conflict. Resolution module 212 may also request permission from the first user before proceeding.

In other examples, syntactic or semantic conflicts may arise when a user performs an operation on a feature while a second user performs an operation on a parent feature. For example, a first user may create or edit a sketch on the side of an extrude feature while a second user deletes the extrude feature. Analysis module 210 may then determine that undoing the sketch operation on the deleted extrude will result in a syntactic conflict. Resolution module 212 may then perform a resolution operation consisting of blocking the operation and informing the first user that the undo operation cannot proceed because it would create an invalid reference.

In another example, the first user may create or edit a sketch feature on the side of an existing extrude feature while the second user edits the extrude feature. Analysis module 210 may then determine that reversing the operation will create a possible semantic conflict relative to the intent of the conflicting operation. Resolution module 212 may then perform a resolution operation consisting of informing the user that reversing the operation will create a possible semantic conflict. Resolution module 212 may also request permission from the first user before proceeding.

As described in greater detail above, the systems and methods described herein may facilitate reversing operations in synchronous collaborative applications by detecting when reversing an operation may result in an invalid reference due to a syntactic conflict. Systems and methods described herein may also detect potential semantic conflicts in which reversing an operation may conflict with the intent of an operation performed by another user. Where no conflict is created, the systems and methods described herein may permit an undo operation to proceed. Where syntactic conflicts may result, the systems and methods described herein may block the undo operation to prevent invalid references. Where semantic conflicts may result, the systems and methods described herein may issue a warning and request permission before proceeding with the undo operation.

The various elements of the reference invalidation prevention function cooperatively to facilitate productive synchronous collaborative applications. The preceding depiction of the systems and methods for reference invalidation prevention and other inventive elements described herein are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for preventing reference invalidation when reversing operations in synchronous collaborative applications, the method comprising:

storing, on a CAx client, a shared model of an engineering object comprising at least one feature;

receiving, from a user, a first operation to be performed on the feature;

before performing the first operation on the feature, storing, in a command stack on the CAx client, information sufficient to restore the feature to a state existing prior to performing the first operation;

receiving, from the user, a request to reverse the first operation, wherein the first operation comprises deleting the feature or editing the feature;

determining whether reversing the first operation will create an invalid reference due to a second operation having been performed on the feature at a second CAx client, wherein the second operation comprises editing the same feature as the first operation and wherein the invalid reference comprises the first operation creating a possible semantic conflict relative to the state of the feature created by performing the second operation; and in response to determining whether reversing the first operation will create the invalid reference, reversing the first operation or performing a resolution operation to prevent the reference invalidation, wherein the resolution operation comprises informing the user that reversing the first operation will create the possible semantic conflict.

2. The computer-implemented method of claim 1, wherein determining whether reversing the first operation will create the invalid reference comprises one of:

detecting a syntactic conflict between the state of the feature stored in the command stack prior to performing the first operation and a state of the feature created by performing the second operation; and detecting a possible semantic conflict between the state of the feature stored in the command stack prior to performing the first operation and a state of the feature created by performing the second operation.

3. The computer-implemented method of claim 1, wherein the information sufficient to restore the feature to the state prior to performing the first operation comprises:

a pre-operation state of the feature;
an operation identifier; and
a post-operation state of the feature.

4. The computer-implemented method of claim 1, wherein reversing the first operation comprises:

retrieving, from the command stack, the operation identifier; and
restoring the feature to the pre-operation state of the feature.

5. The computer-implemented method of claim 1, wherein:

both the first operation and the second operation comprise deleting the feature; and
reversing the first operation will not create an invalid reference.

6. The computer-implemented method of claim 1, wherein the second operation performed on the feature at the second CAx client comprises an operation performed on a child feature on which the feature depends.

7. The computer-implemented method of claim 6, wherein:

the first operation comprises deleting the feature;
the second operation comprises creating the child feature or editing the child feature; and
the resolution operation comprises informing the user that reversing the first operation will create an invalid syntactic reference.

8. The computer-implemented method of claim 6:
wherein:

the first operation comprises editing the feature;
the second operation comprises creating the child feature or editing the child feature;
further comprising determining that reversing the first operation will create a possible semantic conflict relative to the state of the feature created by performing the second operation; and wherein the resolution operation comprises informing the user that reversing the first operation will create a possible semantic conflict.

9. The computer-implemented method of claim 1, wherein the second operation performed on the feature at the second CAx client comprises an operation performed on a parent feature having a dependency on the feature.

10. The computer-implemented method of claim 9, wherein:

the first operation comprises creating the feature or editing the feature;
the second operation comprises deleting the parent feature; and
the resolution operation comprises informing the user that reversing the first operation will create an invalid reference.

11. The computer-implemented method of claim 9:
wherein:

the first operation comprises creating the feature or editing the feature;
the second operation comprises editing the parent feature;
further comprising determining that reversing the first operation will create a possible semantic conflict relative to the state of the feature created by performing the second operation; and wherein the resolution operation comprises informing the user that reversing the first operation will create a possible semantic conflict.

12. A system for preventing reference invalidation when reversing operations in synchronous collaborative applications, the system comprising:

a storage module, stored in memory, that stores, on a CAx client, a shared model of an engineering object comprising at least one feature;

an operation module, stored in memory, that receives, from a user, a first operation to be performed on the feature;

a history module, stored in memory, that, before performing the first operation on the feature, stores in a command stack on the CAx client, information sufficient to restore the feature to a state existing prior to performing the first operation;

an undo module, stored in memory, that receives, from the user, a request to reverse the first operation, wherein the first operation comprises deleting the feature or editing the feature;

an analysis module, stored in memory, that determines whether reversing the first operation will create an invalid reference due to a second operation having been performed on the feature at a second CAx client, wherein the second operation comprises editing the same feature as the first operation and wherein the invalid reference comprises the first operation creating a possible semantic conflict relative to the state of the feature created by performing the second operation;

a resolution module, stored in memory, that, in response to determining whether reversing the first operation will create the invalid reference, reverses the first operation or performs a resolution operation to prevent the reference invalidation, wherein the resolution operation comprises informing the user that reversing the first operation will create the possible semantic conflict; and at least one physical processor configured to execute the storage module, the operation module, the history module, the undo module, the analysis module, and the resolution module.

13. The system of claim 12, wherein determining whether reversing the first operation will create the invalid reference comprises one of:

detecting a syntactic conflict between the state of the feature stored in the command stack prior to performing the first operation and a state of the feature created by performing the second operation; and detecting a possible semantic conflict between the state of the feature stored in the command stack prior to performing the first operation and a state of the feature created by performing the second operation.

14. The system of claim 12, wherein the information sufficient to restore the feature to the state prior to performing the first operation comprises:
   a pre-operation state of the feature;
   an operation identifier; and
   a post-operation state of the feature.

15. The system of claim 12, wherein the resolution module reverses the first operation by:
   retrieving, from the command stack, the operation identifier; and
   restoring the feature to the pre-operation state of the feature.

16. The system of claim 12, wherein:
   both the first operation and the second operation comprise deleting the feature; and
   reversing the first operation will not create an invalid reference.

17. A non-transitory computer-readable medium comprising one or more computer-readable instructions that, when executed by at least one processor of a computing device, cause the computing device to:

store, on a CAx client, a shared model of an engineering object comprising at least one feature;

receive, from a user, a first operation to be performed on the feature;

before performing the first operation on the feature, store, in a command stack on the CAx client, information sufficient to restore the feature to a state existing prior to performing the first operation;

receive, from the user, a request to reverse the first operation, wherein the first operation comprises deleting the feature or editing the feature;

determine whether reversing the first operation will create an invalid reference due to a second operation having been performed on the feature at a second CAx client, wherein the second operation comprises editing the same feature as the first operation and wherein the invalid reference comprises the first operation creating a possible semantic conflict relative to the state of the feature created by performing the second operation;; and in response to determining whether reversing the first operation will create the invalid reference, reverse the first operation or perform a resolution operation to prevent the reference invalidation, wherein the resolution operation comprises informing the user that reversing the first operation will create the possible semantic conflict.

* * * * *